Aug. 31, 1954          G. ARNOLD ET AL          2,687,859
                          ROCKER CLIP
Filed April 7, 1953                           2 Sheets-Sheet 1

INVENTORS
GEORGE ARNOLD
HARRY A. SCHULTZ
BY
Hudson, Boughton,
Williams, David & Hoffmann
ATTORNEYS Aug. 31, 1954  G. ARNOLD ET AL  2,687,859
ROCKER CLIP
Filed April 7, 1953  2 Sheets-Sheet 2
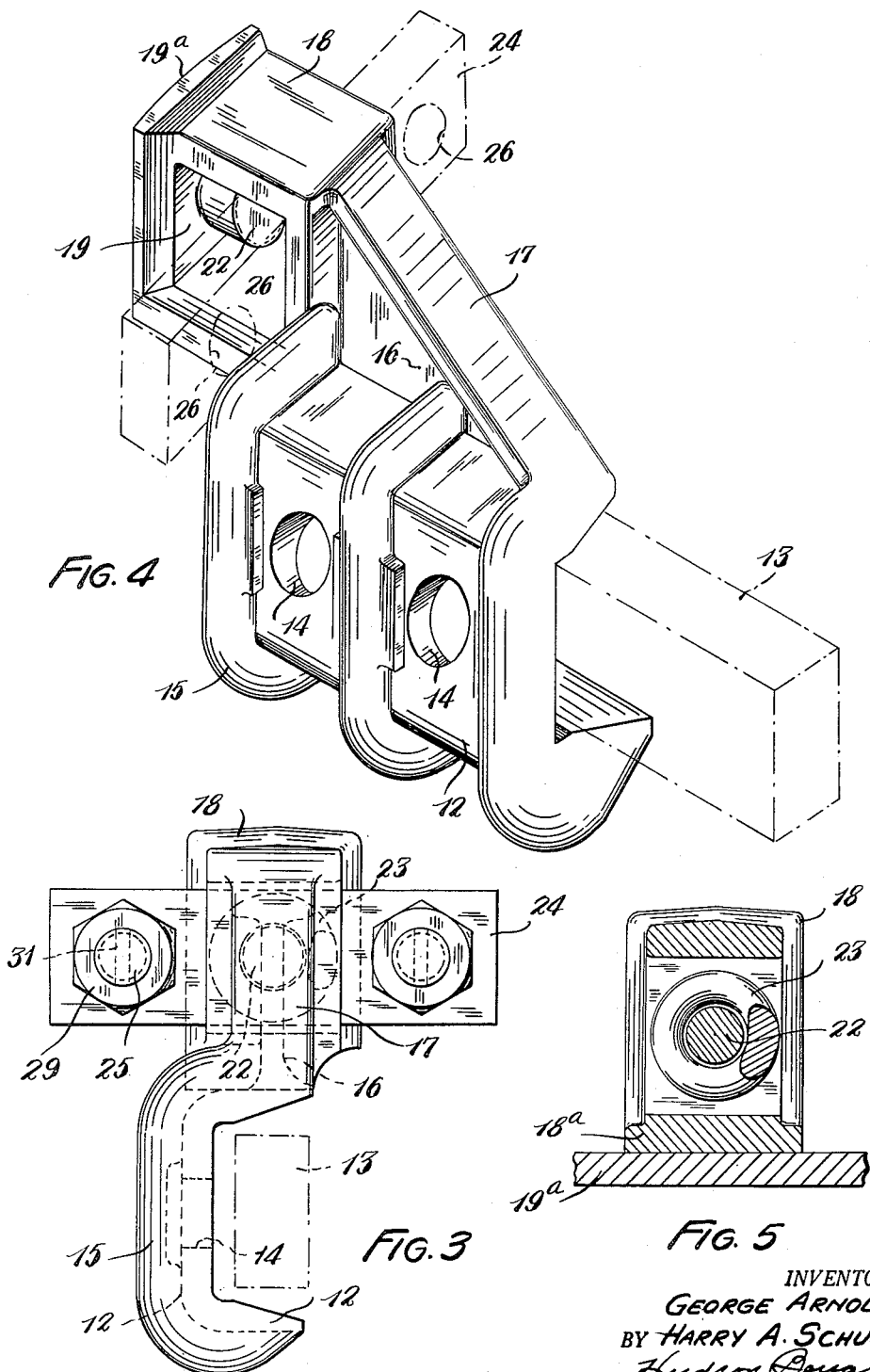
INVENTORS
GEORGE ARNOLD
BY HARRY A. SCHULTZ
Williams, David & Hoffmann
ATTORNEYS Patented Aug. 31, 1954

2,687,859

UNITED STATES PATENT OFFICE 2,687,859

ROCKER CLIP

George Arnold, Shaker Heights, and Harry A. Schultz, Garfield Heights, Ohio, assignors to Cleveland Frog & Crossing Co., Cleveland, Ohio, a corporation of Ohio Application April 7, 1953, Serial No. 347,383

6 Claims. (Cl. 246—452)

This invention relates to a railway switch and particularly to a switch clip which connects the movable switch point to the switch rod. The invention more especially relates to that type of switch clip usually called a "rocker clip."

In railway switches such as "split" switches the movable switch points have connected thereto clips which, in turn, are connected to switch rods that extend beneath the stock rails and are connected to the switch throwing apparatus which when actuated moves the switch points with respect to the stock rails as is well understood in the art.

An object of the invention is to provide an improved and novel switch clip which is efficient in operation, requires a minimum amount of maintenance, can be readily installed or removed and is of simple construction.

A further object is to provide a switch clip such as referred to in the first named object and which is of the "rocker clip" type and can be accurately installed with each installation thereof being identical insofar as the relationship between the clip and the switch point is concerned.

A still further object of the invention is to provide a switch clip wherein that part of the clip that is secured to the switch rod is operatively connected to that part of the clip that is secured to the switch point by means of a spring tensioned operative connection.

Further and additional objects and advantages not hereinbefore enumerated will become apparent hereinafter during the detailed description of an embodiment of the invention which is to follow. Said embodiment of the invention is illustrated in the accompanying drawing forming part of this specification and wherein, Fig. 1 is a side elevational view of a switch clip embodying the invention with the stock rail and switch point shown in section and with the switch rod indicated by dot and dash lines.

Fig. 3 is an end elevational view of the switch clip shown in Figs. 1 and 2 and is taken looking from the right hand side of Fig. 1 (as viewed in the drawings) with the switch point and stock rail omitted.

Fig. 4 is a perspective view of the main member or casting of the switch clip shown in the previous views with the cross plate of the clip being indicated by dot and dash lines as is also the switch rod that is connected to a portion of the main casting or member, and Fig. 5 is a sectional view taken substantially on line 5—5 of Fig. 1, looking in the direction of the arrows.

The switch clip embodying the invention may be applied to various types of switches but for illustrative and descriptive purposes it will be referred to herein as applied to the switch points of a "split" switch. Inasmuch as "split" switches are well known in the art it is felt unnecessary to illustrate herein a complete "split" switch and sufficient to show only one stock rail and one switch point thereof while the switch clip is indicated as operatively connected to a switch rod illustrated by dot and dash lines.

It will be understood that a similar switch clip is connected to the switch rod and to the other switch point of the "split" switch and that said rod extends to a switch stand or throwing apparatus of any desired type.

Figure 1:
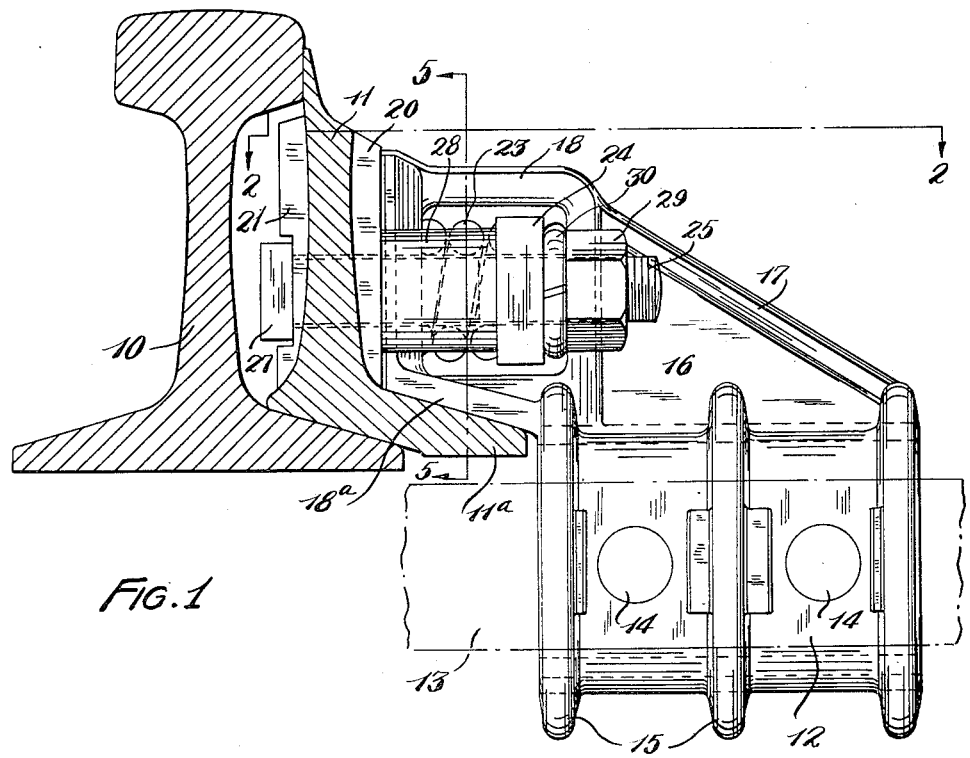
Figure 2:
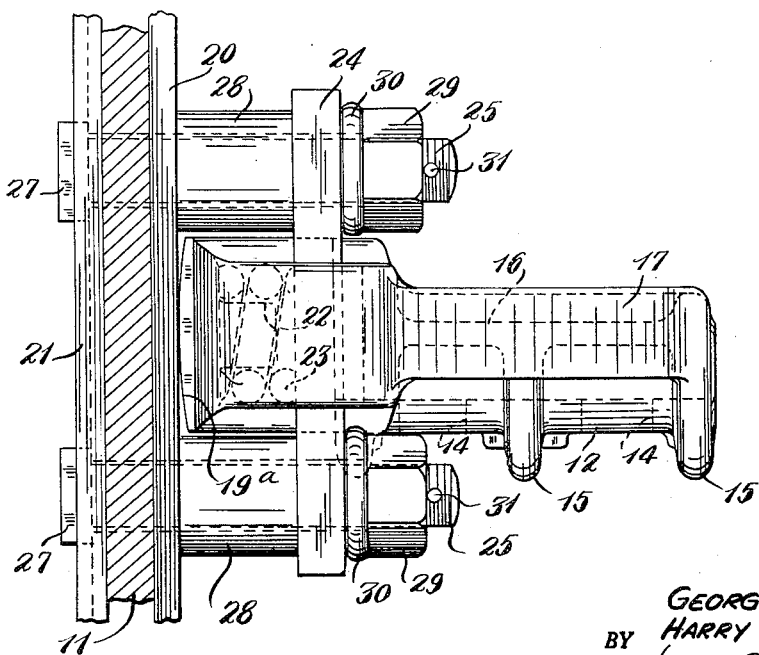
Fig. 2 is a view of the switch clip shown in Fig. 1 and is a partial section and partial top plan and is taken substantialy along irregular line 2—2 of Fig. 1, looking in the direction of the arrows.

In Fig. 1 a stock rail 10 is shown and with which rail a switch point 11 cooperates. As already stated, there will be another stock rail and switch point at the other side of the switch and the stock rails would be supported by the usual tie plates not shown. The stock rail 10 is shown as a standard T-section rail while the switch point 11 also would be of standard T-section suitably planed and shaped as is well understood in the art. As is well understood the switch point moves or swings toward and away from the stock rail through an arc of relatively long radius. It will further be understood that the switch point rests upon the upper and downwardly sloping side of one of the base flanges of the rail.

The switch clip illustrated and embodying the invention includes a main casting or member which preferably is an integral unit and has a lower U-shaped portion 12 which straddles or embraces the switch rod 13 and is connected to the rod by means of suitable bolts and nuts (not shown), with said bolts extending through openings in the switch rod and through openings 14 in the U-shaped portion 12. As already stated, the switch rod 13 extends transversely of the track between and below the stock rails and is operatively connected to a switch stand mechanism that actuates or throws the switch. The U-shaped portion 12 of the main member or casting of the switch clip preferably is provided with reenforcing ribs 15.

The main casting or member of the switch clip further includes a web 16 integral with and extending upwardly from the upper end of the U-shaped portion 12 and lying substantially in the vertical plane that passes midway and vertically through the switch rod 13. The upper edge of the web 16 is shown as provided with an integral flange 17 that extends laterally from both sides of the web and substantially perpendicularly thereto.

The web 16 and flange 17 of the main member or casting merge into a substantially rectangular hollow portion 18. The substantially rectangular hollow portion 18 has its lower wall 18a downwardly inclined to interfit the upper downwardly inclined side of the flange 11a of the switch point 11 as clearly indicated in Figs. 1 and 5.

The rectangular hollow portion 18 of the main member is provided with an end wall 19, the outer side or surface of which is curved as indicated at 19a on a large radius of curvature that is correlated to the radius of the swinging movement of the switch point 11. The curved outer surface 19a of the wall 19 contacts a reenforcing bar 20 that is secured to one side of the web of the switch point 11 so as to act against the switch point. A similar reenforcing bar 21 is secured to the other side of the web of the switch point 11.

The inner side of the wall 19 and within the hollow rectangular portion 18 is provided with a centrally located stud 22 that extends part way across the hollow interior of the portion 18. A relatively heavy coil spring 23 of predetermined size and strength surrounds the stud 22 with one of its ends abutting the wall 19 while its opposite end abuts one side of a plate 24 that extends through the hollow interior of the portion 18 substantially parallel to the inner side of the wall 19 of the portion 18 as indicated in the drawings.

Bolts 25 spaced longitudinally of the switch point extend through the reenforcing bars 21 and 20 and the web of the switch point 11 and through openings 26 in the plate 24. The heads 27 of the bolts 25 contact the reenforcing bar 21 and are intermediate the switch point 11 and the stock rail 10. The bolts 25 extend through bushings 28 that are interposed between the plate 24 and the reenforcing bar 20. Suitable nuts 29 and lock washers 30 on the bolts 25 act when the nuts are screwed down on the bolts to maintain the plate 24 in contact with one end of the bushings 28, the other end of which bushings is in contact with the reenforcing bar 20.

This arrangement is such that in the installation of the clip the workman simply screws down the nuts 29 as far as he can since, due to the interposed bushings 28, the bar 24 will always at such time be properly located and the workman cannot install the clip with the bar 24 improperly located or with the nuts 29 insufficiently or excessively screwed down on the bolts 25.

If desired, suitable cotter pins can be passed through openings 31 in the bolts to insure against the nuts 29 backing off or loosening on the bolts, although a certain degree of loosening of the nuts on the bolts would not be of serious consequence for a reason later to be pointed out.

It will be seen that the plate 24 floats relative to the hollow rectangular portion 18 of the casting or main member and has no direct positive connection thereto. The plate 24 is operatively connected to the main casting of the clip through the heavy coil spring 23 which it compresses to provide a predetermined spring tension, thus imparting to the clip structure a flexibility that obviates damage thereof from jars or vibration.

It will be seen that when the switch stand is operated to move the switch rod 13 in a direction to move the switch point 11 away from the stock rail 10, such movement of the switch rod 13 moves the main casting or member of the switch clip and this movement of the main casting or member is transmitted through the spring 23 to the plate 24 and thence to the switch point 11 through the bolts 25 and nuts 29.

When the switch stand is actuated to move the switch rod 13 in the opposite direction to effect movement of the switch point 11 toward the stock rail the corresponding movement of the main casting or member of the switch clip first takes up any clearance established by the previous movement between the plate 24 and the outer or right hand wall of the portion 18 due to increased compression of the spring 23, after which said outer or right hand wall of the portion 18 of the casting or member contacts the plate 24 and further movement of the casting or member by the tie bar causes the switch point 11 to come into firm contact with the stock rail 10.

As already stated, when the plate 24 is clamped against the bushings 28 by the nuts 29 is causes a predetermined compression of the spring 23 so that the interrelationship between the main casting and the plate 24 includes a predetermined spring tension. In view of this spring tension a slight backing off of the nuts 29 because of vibration would not materially affect the efficient functioning of the switch clip. However, maintenance crews in checking the switch clip can readily do so merely by making sure that the nuts 29 are screwed down on the bolts 25 as far as possible. It will be understood that in the movements of the switch point 11 toward and from the rail 10 the main member or casting of the switch clip will have a rocking movement relative to the reenforcing bar 20 due to the curved outer surface 19a of the wall 19 of the portion 18, the radius of curvature of which is correlated to the radius of swinging movement of the switch point 11.

From the foregoing description it will be apparent that a switch clip embodying the present invention is of simple, sturdy constructitn, efficient in operation and can always be installed correctly with the desired compression of the spring 23 since all that is necessary is to screw down the nuts 29 as far as possible to clamp the plate 24 against the end of the interposed bushings 28.

Although a preferred embodiment of the invention has been illustrated and described herein it will be understood that the invention is susceptible of various modifications and adaptations within the scope of the appended claims.

Having thus described our invention we claim:

1. In a railway switch having a stock rail, a movable switch point having a web and a base flange, a switch rod for moving said switch point against or away from said stock rail, a switch clip comprising a main member having a portion secured to said rod and a hollow portion engaging the base flange of the switch point and having an end wall acting against the web of the switch point, a plate extending through said hollow portion in spaced relationship to the said end wall thereof and longitudinally of and substantially parallel to said switch point, means outside of said hollow portion rigidly connecting said plate to said switch point, and a spring in said hollow portion of said member and abutting said end wall thereof and the side of said plate that is adjacent to but spaced from said end wall.

2. A railway switch as defined in claim 1 and wherein said end wall of said hollow portion of said member is provided with a surface acting against the web of the switch point and which surface is curved on a radius correlated to the arc of movement of the switch point.

3. A railway switch as defined in claim 1 and wherein the said means for connecting the said plate to the switch point includes bolts extending through the web of the switch point and through said plate, means on said bolts intermediate said web and said plate and spacing said plate a predetermined fixed distance from said web, and nuts on said bolts which when screwed down thereon clamp said plate against said spacing means.

4. A railway switch as defined in claim 1 and wherein said main member comprises a unitary casting having the portion that is secured to the switch rod and said hollow portion and a web portion interconnecting said two first named portions.

5. In a railway switch having a stock rail, a swingable switch point having a web and a base flange, a switch rod for swinging said switch point against or away from said stock rail, a reenforcing bar secured to the web of said switch point on the side thereof provided with said base flange, a switch clip comprising a main member having a portion secured to said rod and a hollow portion engaging the base flange of the switch point and having an end wall contacting said reenforcing bar, a plate extending through said hollow portion in spaced relation to said end wall and longitudinally of and substantially parallel to said switch point, said plate being provided with openings outside of said hollow portion, bolts extending through the web of the switch point and said reenforcing bar and the openings in said plate, bushings on said bolts intermediate said reenforcing bar and said plate, nuts on said bolts which when screwed down clamp said plate against one end of said bushings and maintain the other end thereof in contact with said reenforcing bar wherefore said plate is spaced a predetermined distance from said reenforcing bar, and a spring within said hollow portion of said member and having one end abutting the said end wall of said portion and its other end abutting the side of said plate that is adjacent to said end wall wherefore said spring operatively interconnects said member and said plate.

6. A railway switch as defined in claim 5 and wherein said end wall of said hollow portion of said main member is provided interiorly of the hollow portion with a centrally located stud projecting partially across said hollow portion toward said plate, while said spring is a coil spring which surrounds said stud and is maintained under predetermined compression between said plate and said end wall.

No references cited.